(12) United States Patent
Kruglick

(10) Patent No.: US 10,198,745 B2
(45) Date of Patent: *Feb. 5, 2019

(54) ASSOCIATING AD RESULTS WITH PURCHASES MADE VIA MOBILE DEVICES

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/172,753

(22) Filed: Feb. 4, 2014

(65) Prior Publication Data
US 2014/0156400 A1 Jun. 5, 2014

Related U.S. Application Data

(63) Continuation of application No. 13/501,042, filed as application No. PCT/US2011/022992 on Jan. 28, 2011, now Pat. No. 8,688,492.

(51) Int. Cl.
*G06Q 10/00* (2012.01)
*G06Q 30/02* (2012.01)
*H04M 3/487* (2006.01)

(52) U.S. Cl.
CPC ......... *G06Q 30/0255* (2013.01); *G06Q 30/02* (2013.01); *H04M 3/4878* (2013.01)

(58) Field of Classification Search
CPC ........ G06Q 10/00; G06Q 40/00; G06Q 30/02; G06Q 30/0255; G06F 17/60

USPC ...................................... 705/7.11, 7.14–7.29
See application file for complete search history.

(56) References Cited

U.S. PATENT DOCUMENTS

| | | | |
|---|---|---|---|
| 6,026,370 A | 2/2000 | Jermyn | |
| 7,395,185 B2* | 7/2008 | Wittkowski | 702/179 |
| 7,664,616 B2* | 2/2010 | Wittkowski | 702/179 |
| 7,685,019 B2 | 3/2010 | Collins | |
| 8,091,031 B2 | 1/2012 | Evans | |
| 8,352,320 B2 | 1/2013 | MacDonald et al. | |
| 8,510,309 B2 | 8/2013 | Priyadarshan et al. | |
| 8,515,805 B1* | 8/2013 | Rennison | G06Q 30/0251 705/14.54 |
| 8,554,626 B2* | 10/2013 | Pulijala | G06Q 30/0267 705/14.64 |
| 8,571,934 B2* | 10/2013 | Rosenberg | G06Q 30/0241 705/14.4 |
| 8,583,483 B2* | 11/2013 | Chung | G06Q 30/02 705/14.4 |
| 8,676,900 B2* | 3/2014 | Yruski | G06Q 30/02 705/14.1 |

(Continued)

OTHER PUBLICATIONS

Drossos, D., et al., Determinants of effective SMS advertising: an experimental study, Journal of Interactive Advertising, Spring 2007, vol. 7, No. 2, pp. 16-27, accessed online on Apr. 9, 2012 via http://jiad.org/article90.

(Continued)

*Primary Examiner* — Romain Jeanty

(57) ABSTRACT

Implementations and techniques for associating ad results with purchases made via mobile devices are generally disclosed.

23 Claims, 4 Drawing Sheets

(56) References Cited

U.S. PATENT DOCUMENTS

| | | | | |
|---|---|---|---|---|
| 8,688,518 | B2* | 4/2014 | Ranka | G06Q 30/0244 705/14.4 |
| 8,732,006 | B2* | 5/2014 | Spinnell | G06Q 30/02 705/14.1 |
| 8,799,070 | B1* | 8/2014 | Sheinfeld | G06Q 30/0242 705/14.45 |
| 9,009,066 | B2* | 4/2015 | Long | G06Q 30/02 705/14.68 |
| 2003/0078677 | A1 | 4/2003 | Hull et al. | |
| 2003/0154126 | A1* | 8/2003 | Gehlot | G06Q 30/02 705/14.53 |
| 2005/0119976 | A1* | 6/2005 | Taylor | G06Q 30/06 705/52 |
| 2009/0094114 | A1 | 4/2009 | Rice et al. | |
| 2009/0247140 | A1* | 10/2009 | Gupta et al. | 455/418 |
| 2010/0138553 | A1 | 6/2010 | Yuan et al. | |

OTHER PUBLICATIONS

Web Analytics Book, Mobile advergaming=another way to make you buy "great" products, Nov. 24, 2007, accessed online on Apr. 9, 2012 via http://www.webanalyticsbook.com/marketing/mobile-advergaming-another-way-to-make-you-buy-great-products/.

COMSCORE, Comscore Website Information, accessed online on Apr. 9, 2012 via http://www.comscore.com/.

Madhouse, Madhouse Mobile Ad Network website information, accessed online on Apr. 9, 2012 via http://www.madhouse.cn/en/index.php.

Panis, S., et al., Mobile commerce service scenarios and related business models, Eurescom project 1102, Jul. 12, 2002, accessed online on Apr. 9, 2012 via http://archive.eurescom.eu/~public-web-deliverables/P1100-series/P1102/conferences/M-Business-2002.ppt.

Sterling, Greg, Google to introduce click-to-call (billing) in ads on mobile devices, Search Engine Land, Jan. 5, 2010, accessed online on Apr. 9, 2012 via http://searchengineland.com/google-to-introduce-click-to-call-billing-in-ads-on-mobile-devices-32831.

OSS News Review, Amdocs introduces unified mobile commerce, search and advertising platform, OSS News Review, Feb. 11, 2008, accessed online on Apr. 9, 2012 via http://www.ossnewsreview.com/telecom-oss/amdocs-introduces-unified-mobile-commerce-search-and-advertising-platform/.

Singel, Ryan, Privacy groups want feds to investigate targeted ads, Wired Epicenter, Apr. 9, 2010, accessed online on Apr. 9, 2012 via http://www.wired.com/epicenter/2010/04/privacy-groups-want-feds-to-investigate-targeted-ads/.

Okazaki, Shintaro, Mobile advertising adoption by multinationals: senior executives' initial responses, Internet Research, 2005, vol. 15, issue 2, pp. 160-180, Emerald Group Publishing Ltd.

United States Patent Office, International Search Report and Written Opinion of the International Searching Authority for PCT/US2011/022992, mailed on Nov. 16, 2011.

* cited by examiner

300 A computer program product.

302 A signal bearing medium.

304 Machine-readable instructions, which, if executed by one or more processors, operatively enable a computing device to:

collect a first data set that includes ad result data associated with ad results delivered to the plurality of mobile devices, wherein the ad result data is associated with time of delivery data as well as user identity data;

collect a second data set that includes purchase data associated with purchases made via the plurality of mobile devices, wherein the purchase data is associated with purchased product data, time of purchase data as well as user identity data; and/or determine an indication of change in user response to one or more of the ad results based at least in part on comparing the first data set and the second data set on a user-by-user basis.

| 306 a computer-readable medium. | 308 a recordable medium. | 310 a communications medium. |

Fig. 3

ASSOCIATING AD RESULTS WITH PURCHASES MADE VIA MOBILE DEVICES

CROSS-REFERENCE TO RELATED APPLICATIONS

This application is a Continuation under 35 U.S.C. § 120 of U.S. application Ser. No. 13/501,042, filed on Apr. 9, 2012, now U.S. Pat. No. 8,688,492, which is a U.S. National Stage entry under 35 U.S.C. § 371 of International Application No. PCT/US11/22992, filed on Jan. 28, 2011. Application Ser. No. 13/501,042 and Application No. PCT/US11/22992 are hereby incorporated by reference in their entireties.

BACKGROUND

Unless otherwise indicated herein, the approaches described in this section are not prior art to the claims in this application and are not admitted to be prior art by inclusion in this section.

Some credit card companies go through customer transactions to identify advertising targets for other companies. However, those credit card companies often may not have records of advertising delivered to the customers to utilize for lead generation.

Mobile phone billing may used to pay for everything from phone calls, to food, and taxi rides, for example. Many billions of non-telecom transactions may be made with billing going through mobile telephone accounts every year, and more people now own mobile phones than own computers, televisions, or even FM radios. It is expected that the use of mobile phone billing will increase greatly over the coming years.

SUMMARY

Some example methods, apparatus, and systems related to associating ad results with purchases made via mobile devices may be implemented in a communication network associated with a plurality of mobile devices. Such methods may include collecting, via a mobile service provider portion of the communication network, a first data set. Such a first data set may include ad result data associated with ad results delivered to the plurality of mobile devices, where the ad result data may be associated with time of delivery data as well as user identity data. A second data set may be collected via the mobile service provider. Such a second data set may include purchase data associated with purchases made via the plurality of mobile devices, where the purchase data may be associated with purchased product data, time of purchase data, as well as user identity data. An indication of change in user response to one or more of the ad results may be determined based at least in part on comparing the first data set and the second data set on a user-by-user basis.

Some example methods, apparatus, and systems related to associating ad results with purchases made via mobile devices may be implemented in a communication network associated with a plurality of mobile devices. Such methods may include collecting, via a mobile service provider portion of the communication network, a first data set. Such a first data set may include ad result data associated with ad results delivered to the plurality of mobile devices, where the ad result data may be associated with time of delivery data as well as user identity data. A second data set may be collected via the mobile service provider. Such a second data set may include user location data, where the user location data may be associated with time data as well as user identity data. An indication of change in user response to one or more of the ad results may be determined based at least in part on comparing the first data set and the second data set on a user-by-user basis.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 3 is an illustration of an example computer program product that is arranged in accordance with at least some embodiments of the present disclosure.

DETAILED DESCRIPTION

Figure 1:
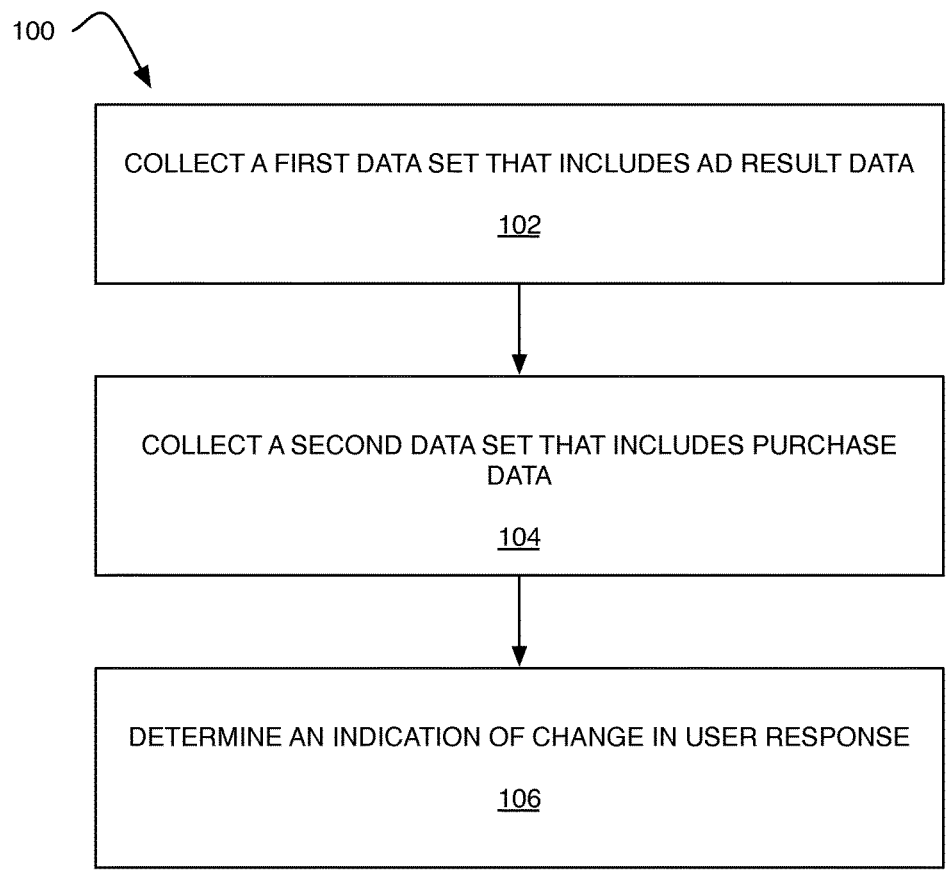
FIG. 1 illustrates an example process for associating ad results with purchases made via mobile devices that is arranged in accordance with at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to associating ad results with purchases made via mobile devices.

As discussed above, it is expected that the use of mobile phone billing will increase greatly over the coming years. Mobile devices may be utilized to make purchases and may also be utilized to receive ad results. As will be discussed below, the long term or delayed effect of mobile advertising may be tracked via a mobile service provider. Mobile service providers have a distinctive position with access to delivered mobile ad results, personal information, purchase records, and/or location information. Accordingly, such tracking via a mobile service provider might recognize a delayed effect of advertising based at least in part on later purchases made via the mobile device and/or later location information (e.g., location information indicating a user visiting a particular business).

FIG. 1 illustrates an example process for associating ad results with purchases made via mobile devices that is arranged in accordance with at least some embodiments of the present disclosure. Process 100, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 1 may be practiced in various implementations. For example, although process 100, as shown in FIG. 1, may comprise one particular order of blocks or actions, the order in which these blocks or actions are presented does not necessarily limit claimed subject matter to any particular order. Likewise, intervening actions not shown in FIG. 1 and/or additional actions not shown in FIG. 1 may be employed and/or some of the actions shown in FIG. 1 may be eliminated, without departing from the scope of claimed subject matter. Process 100 may include one or more functional operations as indicated by example operations 102, 104, and/or As illustrated, process 100 may be implemented for routing communications in a communication network (see FIG. 2) associated with a plurality of mobile devices (see FIG. 2). Processing may begin at operation 102, "collect a first data set that includes ad result data", where collection of a first data set may be performed. Such collection may be performed via a mobile service provider portion of the communication network. For example, such a first data set may include ad result data associated with ad results delivered to the plurality of mobile devices, where the ad result data may be associated with time of delivery data as well as user identity data. As used herein the phrase "ad," "ad result," "advertising," and/or the like may refer to online pop-up ads, floating ads, wallpaper ads, banner ads, trick banner ads, mobile ads, the like, and/or combinations thereof. Additionally or alternatively, such result data may also indicate whether ad results were clicked or not, and/or how long such ad results were displayed. As used herein the term "user identity data" may refer to an identity associated with an individual mobile device such as an individual's identity (e.g., an identity of a user of a mobile device) or mobile device's identity (e.g., an identity of the given mobile device), for example. In one example, an individual mobile device might be associated with multiple logins, each associated with an individual's identity. In such a case, the communication network may track which user was logged on to the mobile device when a given ad result was delivered, and/or may track which user was logged on to the mobile device when a purchase was made.

Processing may continue from operation 102 to operation 104, "collect a second data set that includes purchase data", where collection of a second data set may be performed. Such collection may be performed via the mobile service provider portion of the communication network. For example, such a second data set may include purchase data associated with purchases made via the plurality of mobile devices, where the purchase data may be associated with purchased product data, time of purchase data, as well as user identity data. Additionally or alternatively, such a second data set may include user location data, where the user location data may be associated with time data as well as user identity data.

Processing may continue from operation 104 to operation 106, "determine an indication of change in user response", where an indication of change in user response to one or more of the ad results may be determined. For example, an indication of change in user response to one or more of the ad results may be determined based at least in part on comparing the first data set and the second data set on a user-by-user basis. As used herein the term "indication of change" may refer to a statistically significant change in user behavior across a population of users, for example. For example, such an "indication of change" might indicate that users who received an ad result were more likely to purchase a product associated with the ad result than other users who visited the same web site without receiving such an ad result. Some additional and/or alternative details related to process 100 may be illustrated in one or more examples of implementations discussed in greater detail below with regard to FIG. 2.

Figure 2:
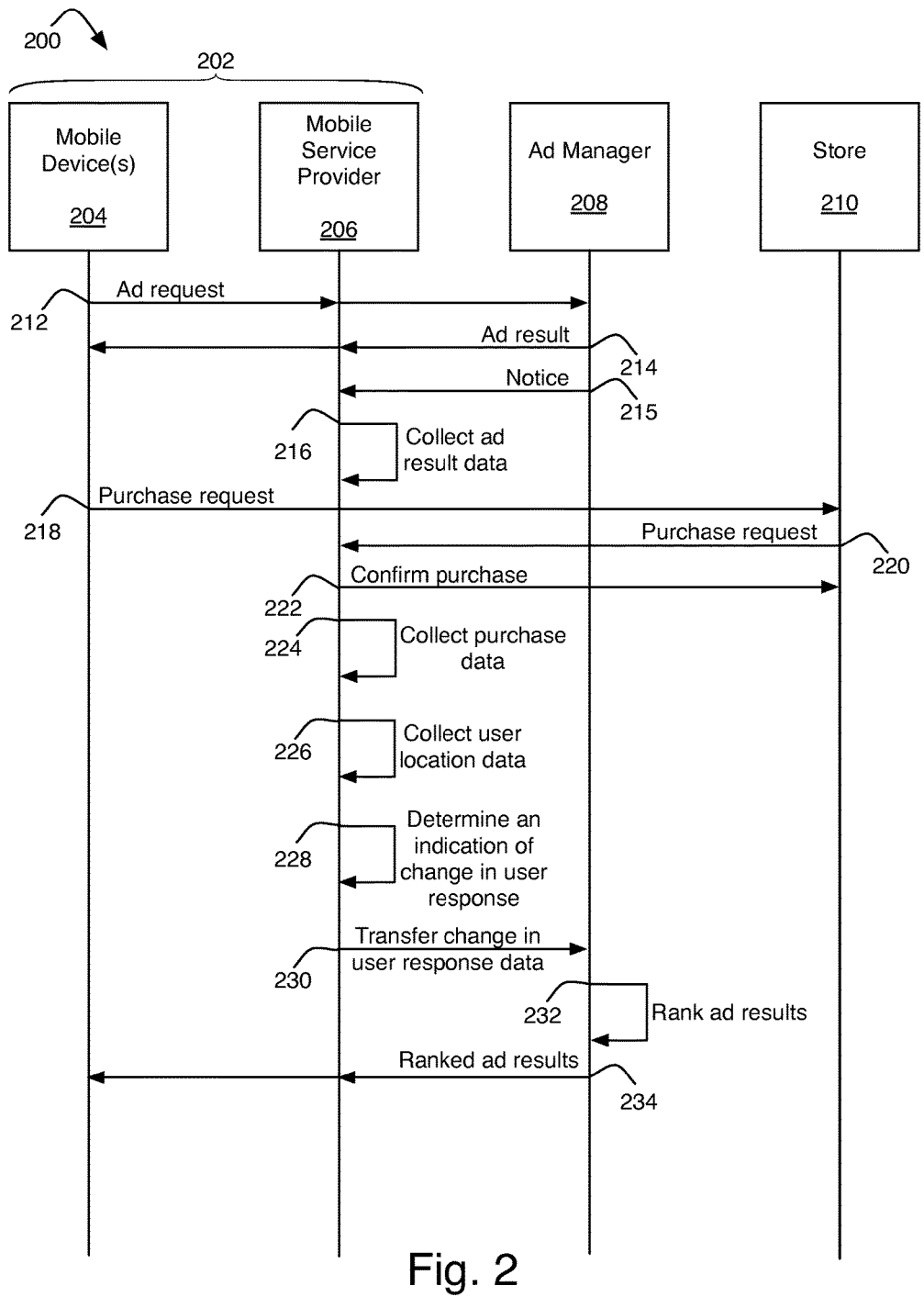
FIG. 2 illustrates another example process for associating ad results with purchases made via mobile devices that is arranged in accordance with at least some embodiments of the present disclosure.

FIG. 2 illustrates another example process for associating ad results with purchases made via mobile devices that is arranged in accordance with at least some embodiments of the present disclosure. Process 200 may include one or more of operations as illustrated by operations 212, 214, 215, 216, 218, 220, 222, 224, 226, 228, 230, 232 and/or 234.

Process 200 may provide one or more examples of implementations of process 100 of FIG. 1. As illustrated, process 200 may be implemented for routing communications in a communication network 202 associated with a plurality of mobile devices 204 and a mobile service provider 206. As used herein the term "communication network" may refer to any number of communication systems including a plurality of mobile devices adapted for wireless communication with one another via the communication network. For example, such a communication network 202 may refer to any number of communication systems including one or more of the following: a cellular phone network, a mobile worldwide interoperability for microwave access network (WiMax), voice over Internet protocol (IP) system (e.g., via a wireless local area network (WLAN), a wireless wide area network (WWAN), or the like), the like, and/or combinations thereof, according to the particular application. Additionally or alternatively, such a communication network 202 may refer to any number of communication systems that provide Internet access to a plurality of mobile devices.

Communication network 202 may include one or more mobile devices 204. Mobile devices 204 may be arranged (e.g., coupled) in communication with mobile service provider portion 206 of communication network 202. As used herein the term "mobile device" may refer to mobile devices such as a cell phone, a personal data assistant (PDA), the like, and/or combinations thereof, for example. As used herein the term "mobile service provider" may refer to a mobile service provider portion of communication network such as a central management center, a mobile phone network operator, or the like that is configured to facilitate communication among a plurality of mobile devices.

Mobile service provider 206 may be capable of communication with an ad manager 208 and/or a store 210. Such an ad manager 208 may be capable of supplying advertising content (referred to herein as ad results) in response to requests for advertising (referred to herein as ad requests). Such a store 210 may be a retailer or other business that may engage in purchase transactions with a user of mobile device 204 via mobile service provider 206.

As illustrated, process 200 may begin at operation 212, "ad request", where mobile device 204 may send an ad request to ad manager 208 via mobile service provider 206. For example, mobile device 204 may send an ad request to ad manager 208 via mobile service provider 206 when accessing online content (e.g., a web-page or the like).

Processing may continue from operation 212 to operation 214, "ad result", where mobile device 204 may receive an ad result from ad manager 208 via mobile service provider 206. For example, ad manager 208 may be capable of supplying ad results in response to ad requests. Ad manager 208 may select and/or rank ad results based on any number of criteria to deliver the most relevant and/or most profitable ads to mobile device 204.

Processing may continue from operation 214 to operation 216, "collect ad result data", where collection of a first data set may be performed. Such collection may be performed via mobile service provider 206. For example, such a first data set may include ad result data associated with ad results delivered to mobile devices 204, where the ad result data may be associated with time of delivery data as well as user identity data.

In one example, as ad results are delivered to mobile devices 204, mobile service provider 206 may build a database list of which ad, for which product, is delivered to which user, and at what time of day and date (e.g., time of purchase data). Such a database already has value as mobile service provider 206 has access to user identity data that may include persistent personal information on the user, such as their name and possibly a credit card number or the like.

In one example, at operation 216, mobile service provider 206 may collect the first data set based at least in part on "sniffing" the ad results. For example, such "sniffing" may include the mobile service provider 206 collecting the first data set based at least in part on a review of packet headers associated with the ad results, where such packet headers may identify the communication as originating from an ad manager 208.

In another example, process 200 may optionally continue from operation 214 to operation 215 "notice" where a notice from ad manager 208 may be received via mobile service provider 206. In such an example, a notice from ad manager 208 may be received via mobile service provider 206 where the notice may include the ad result data delivered separately from the ad result itself. In such an example, at operation 216, mobile service provider 206 may collect the first data set without directly monitoring the ad results themselves. In one example, an ad request sent via mobile service provider 206 may be recognized by ad manager 208 as coming from a mobile service provider based at least in part on information in the network data. In such an example, ad manager 208 may send notice 215 to mobile service provider 206 to provide an explicit separate data message regarding the ad result. In another example, ad manager 208 may send notice 215 to any type of ad request (e.g., mobile or non-mobile) to provide an explicit separate data message regarding the ad result.

Additionally or alternatively, the first data set may include user location data. In such an example, the user location data may be associated with the time of delivery data as well as the user identity data. For example, such collected location data associated with the first data set may be utilized so advertisers can find locations or regions where their advertising is shown to be more or less effective, as will be described in greater detail below at operation 228.

Processing may continue from operation 216 to operation 218, "purchase request", where store 210 may receive a purchase request via mobile device 204. For example, a short-range communication-type transaction may be facilitated by mobile device 204. In some examples, Near Field Communication-type (NFC) short-range communication technology, Bluetooth-type short-range communication technology, radio-frequency identification-type (RFID) short-range communication technology, and/or the like, may be utilized in such an operation.

Processing may continue from operation 218 to operation 220, "purchase request", where mobile service provider 206 may receive the purchase request via store 210. For example, store 210 may forward the purchase request originally made via mobile device 204 to mobile service provider 206 for confirmation.

Processing may continue from operation 220 to operation 222, "confirm purchase", where store 210 may receive a confirmation of the purchase via mobile service provider 206. For example, store 210 may receive a confirmation of the purchase via mobile service provider 206 completing the transaction.

Operations 218-222 represent one type of transaction facilitated by mobile service provider 206. Other types of transaction may be facilitated by mobile service provider 206. In one example, a transaction may involve a purchase request sent from mobile device 204 to store 210 and a confirmation of purchase being sent from store 210 to mobile service provider 206 (e.g., as might be done in a Short Message Service-type (SMS) transaction, or the like). In another example, a transaction may involve a purchase request sent from mobile device 204 to mobile service provider 206 via store 210, a request for approval sent to mobile device from mobile service provider 206, an approval sent from mobile device to mobile service provider 206, and a confirmation of purchase being sent from mobile service provider 206 to store 210. Additional or alternative types of transactions may be facilitated by mobile service provider 206, consistent with process 200, where mobile service provider 206 has access to purchase data generated by such transactions.

Operations 212-216 represent the delivery of ad result data while operations 218-222 represent a transaction facilitated by mobile device 204 and/or mobile service provider 206. Such delivery of ad result data at operations 212-216 and transactions at operations 218-222 may occur repeatedly and/or be interspersed with one another.

Processing may continue from operation 222 to operation 224, "collect purchase data", where collection of a second data set may be performed. Such collection may be performed via mobile service provider 206. For example, such a second data set may include purchase data associated with purchases made via the plurality of mobile devices 204, where the purchase data may be associated with purchased product data, time of purchase data, as well as user identity data.

In addition or in the alternative to operation 224, processing may continue from operation 216 to operation 226, "collect location user data", where collection of the second data set may be performed. For example, such a second data set may include user location data, where the user location data may be associated with time data as well as user identity data. Such location data may be collected with or without purchases occurring. In cases where purchases do not occur, such location data may be collected in order to track whether users go into a particular business address after receiving a given ad result.

Processing may continue from operation 224 and/or 226 to operation 228, "determine an indication of change in user response", where an indication of change in user response to one or more of the ad results may be determined. For example, an indication of change in user response to one or more of the ad results may be determined via mobile service provider 206 based at least in part on comparing the first data set and the second data set on a user-by-user basis.

In some examples, an indication of change in user response to one or more of the ad results may be determined based on one or more levels of abstraction/specificity. For example, an indication of change in user response to one or more of the ad results may be determined based at least in part on data associated with all users of mobile devices 204, data associated with a subset of all users of mobile devices 204, data associated with a subset of all users of mobile devices 204 who fall into a designated demographic (age, location, etc.), data associated with an individual user of a mobile device 204, and/or the like.

In examples associating the user location data with business address data, the determination of an indication of change in user response may be based at least in part on the user location data associated with the business address data. For example, an ad result for a car brand from the first data set may be statistically associated with user location data indicating the user visited the business address of a car dealership so as to indicate a change in user response to the ad result for a car brand.

In some examples, an indication of change in user response to one or more of the ad results may be determined in response to a statistical query from a third party. For example, an ad agency might formulate such a statistical query to monitor the success of a current ad campaign or to formulate a new ad campaign.

Additionally or alternatively, the first data set and second data set form portions of a combined database. For example, during mobile transaction reconciliation in preparation for billing, mobile service provider 206 may compare the second data set (e.g., purchase data and/or location data) with the first data set (e.g., the ad result data) and produce such a combined database that may match ad results served with later transactions that may not otherwise be associated. In such an example, one or more third parties may be allowed access to such a combined database in order to formulate such statistical queries to monitor the success of a current ad campaign or to formulate a new ad campaign. In such an example, the combined database may be anonymized based at least in part on utilizing the user identity data in a coded format. Such a coded format may be based at least in part on a one way hash function or the like.

In another example, the second data set may be supplied or supplemented by information from a third party. For example, third parties' purchase databases may be anonymized based at least in part on utilizing the user identity data in a coded format. Such a coded format may be based at least in part on a one way hash function or the like. In such an example, operation 228 may include performing an anonymized comparison to identify users who received ad results and then made a purchase in a channel other than (or in addition to) via mobile device 204 such as in person store sales. Such a second data set that is supplied or supplemented by information from a third party may be utilized to judge targeted advertising (e.g., such as might be associated with deep packet inspection or the like), proximity based advertising, location based advertising, the like, and/or combinations thereof. For example, if a company pushes ads for their products to users shopping in the mall where the company has a store, such a second data set that is supplied or supplemented by information from a third party may be utilized to evaluate the effectiveness of that proximity based advertising and/or location based advertising.

Additionally or alternatively, mobile service provider 206 may have the first data set anonymized based at least in part on utilizing the user identity data in a coded format. For example, mobile service provider 206 may take the first data set (e.g., the ad result data associated with user identity data such as name and/or address) and pass this through a one way hash function. Accordingly, mobile service provider 206 may make the anonymized first data set, the anonymized second data set (including purchase and/or user location data collected via mobile service provider 206, and/or including data from third parties' purchase databases), and/or an anonymized combined database available to a third party in order to answer statistical queries to monitor the success of a current ad campaign or to formulate a new ad campaign.

Processing may continue from operation 228 to operation 230, "transfer change in user response data", where an indication of change in user response may be transferred to a third party via mobile service provider 206. For example, an indication of change in user response may be transferred to a third party (e.g., ad manager 208 or some other third party, such as a third party who has submitted a statistical query) via mobile service provider 206.

In some examples, the determination of an indication of change in user response may be anonymized prior to delivery to ad manager 208 or some other third party. For example, the determination of an indication of change in user response may be anonymized based at least in part on utilizing the user identity data in a coded format. Such a coded format may be based at least in part on a one way hash function or the like.

In examples where the indication of change in user response is transferred to ad manager 208, processing may continue from operation 230 to operation 232, "rank ad results", where ad results may be ranked based at least in part on the indication of change in user response. For example, ad manager 208 may return ranked ad results at operation 234 ("ranked ad results") in response to a request (such as ad request 212) from mobile device 204, where the ranking of such ad results may be ranked based at least in part on the indication of change in user response. In such an example, those ad results determined to be most relevant by ad manager 208 based at least in part on the indication of change in user response may be delivered to mobile device 204. Additionally or alternatively, some or all of the operations described with respect to ad manager 208 may be performed via mobile service provider 206. For example, ad manager 208 might submit a collection of ad results and mobile service provider 206 may rank the ad results based at least in part on previously observed change in user response data. In other examples, mobile service provider 206 may forward an ad request with some associated change in user response data to ad manager 208.

While process 100 and process 200 have been described above as primarily performing operations via mobile service provider 206, it will be appreciated that some or all of these operations may be performed for mobile service provider 206 through a separate entity/device associated with the mobile service provider 206. As used herein, the term "mobile service provider" refers to any group of entities/devices configured to perform the operations designated to mobile service provider 206 in process 100 and/or process 200.

In some examples, at least a portion of the purchases may be non-contemporaneous with an associated ad result. As used herein the term "non-contemporaneous" refers to purchases that occur after a related ad result is no longer presented on mobile device 204. In operation, mobile service provider 206 may form a database of ad results delivered to mobile device 204 and later compare it against purchases by a user of that mobile device during mobile billing reconciliation, resulting in an advertising impact dataset with value to both the advertising agencies (such as Google™ and Bing™) and the retailers (who will be able to measure impact). In one example, a list of consumer purchases made after experiencing mobile advertising may be made that may be utilized to track purchases that may possibly not immediately occur. Accordingly, process 200 may associate ad results with user activity without necessarily immediately tying advertising delivery to sale conversion or personal data using persistent cookies. For example, Internet advertising networks spend a lot of time justifying the expense of advertising to their users. In cases of immediate sales the measurement is often made as the same session ID or cookie may be tracked from advertising impression to sale. However such operations do not address the tracking of delayed (e.g., non-contemporaneous) impact. Companies may spend a great deal of money using questionnaires and "Q score" type surveys to try to track the long term effect of their advertising. For example, recently several companies have started using information harvested from social networks to associate individual names and personal information with both the delivered advertising and purchases, but such an approach is hit-or-miss.

In operation, process 200 exploits the fact that in some forms of mobile billing mobile service provider 206 may have access to both advertising impressions (e.g., ad results) and to financial transaction information (e.g., purchase data and/or location data). When ad results are delivered to mobile device 204, a user may view the advertising in the ad result while mobile service provider 206 may collect ad result data (e.g., a database of ads associated with each user and their time and date of delivery might be collected). Note that already mobile service provider 206 may have more information than ad manager 208 since mobile service provider 206 may know who the user of mobile device 204 is. Mobile service provider 206 also may have billing information (e.g., purchase data), and may compare mobile purchases with ad result data (e.g., to generate a database of purchases related to ad results). For example, mobile service provider 206 may compare mobile purchases with ad result data to generate a database of purchases related to ad results even if made at widely different times (e.g., non-contemporaneous) than the time when the ad result was delivered and/or if the user bought a competing product. Additionally or alternatively, mobile service provider 206 also may have location information (e.g., user location data), and may compare user location data with ad result data (e.g., to generate a database of user location related to ad results). For example, mobile service provider 206 may compare user location with ad result data to generate a database of user location (e.g., which may be indicative of a user visiting a particular business address associated with a particular merchant) related to ad results even if made at widely different times (e.g., non-contemporaneous) than the time when the ad result was delivered and/or if the user went to a competing merchant location. Accordingly, process 200 may provide information like cumulative advertising effect, effect on competitor sales, and even information broken down by ZIP codes or other information (since, again, mobile service provider 206 has the user identity data of the recipients of the ad results whether they purchase or not).

In operation, mobile service provider 206 may maintain user privacy from third parties throughout process 200. For example, process 200 may make the anonymized first data set, the anonymized second data set (including purchase and/or user location data collected via mobile service provider 206, and/or including data from third parties' purchase databases), and/or an anonymized combined database available to a third party in order to formulate statistical queries to monitor the success of a current ad campaign or to formulate a new ad campaign. In other examples, the determination of an indication of change in user response may be anonymized prior to delivery to ad manager 208 or some other third party. Accordingly, mobile service provider 206 may avoid providing personal information or revealing user identity information to a third party.

FIG. 3 illustrates an example computer program product 300 that is arranged in accordance with at least some examples of the present disclosure. Computer program product 300 may include a signal bearing medium 302. Signal bearing medium 302 may include one or more machine-readable instructions 304, which, if executed by one or more processors, may operatively enable a computing device to provide the functionality described above with respect to FIG. 1 and/or FIG. 2. Thus, for example, referring to the system of FIG. 2 one or more mobile service providers 206 may undertake one or more of the actions shown in FIG. 1 and/or FIG. 2 in response to instructions 304 conveyed by signal bearing medium 302.

In some implementations, signal bearing medium 302 may encompass a computer-readable medium 306, such as, but not limited to, a hard disk drive (HDD), a Compact Disc (CD), a Digital Versatile Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass communications medium 310, such as, but not limited to, a digital and/or an analog communication medium (e.g., a fiber optic cable, a waveguide, a wired communication link, a wireless communication link, etc.).

Figure 4:
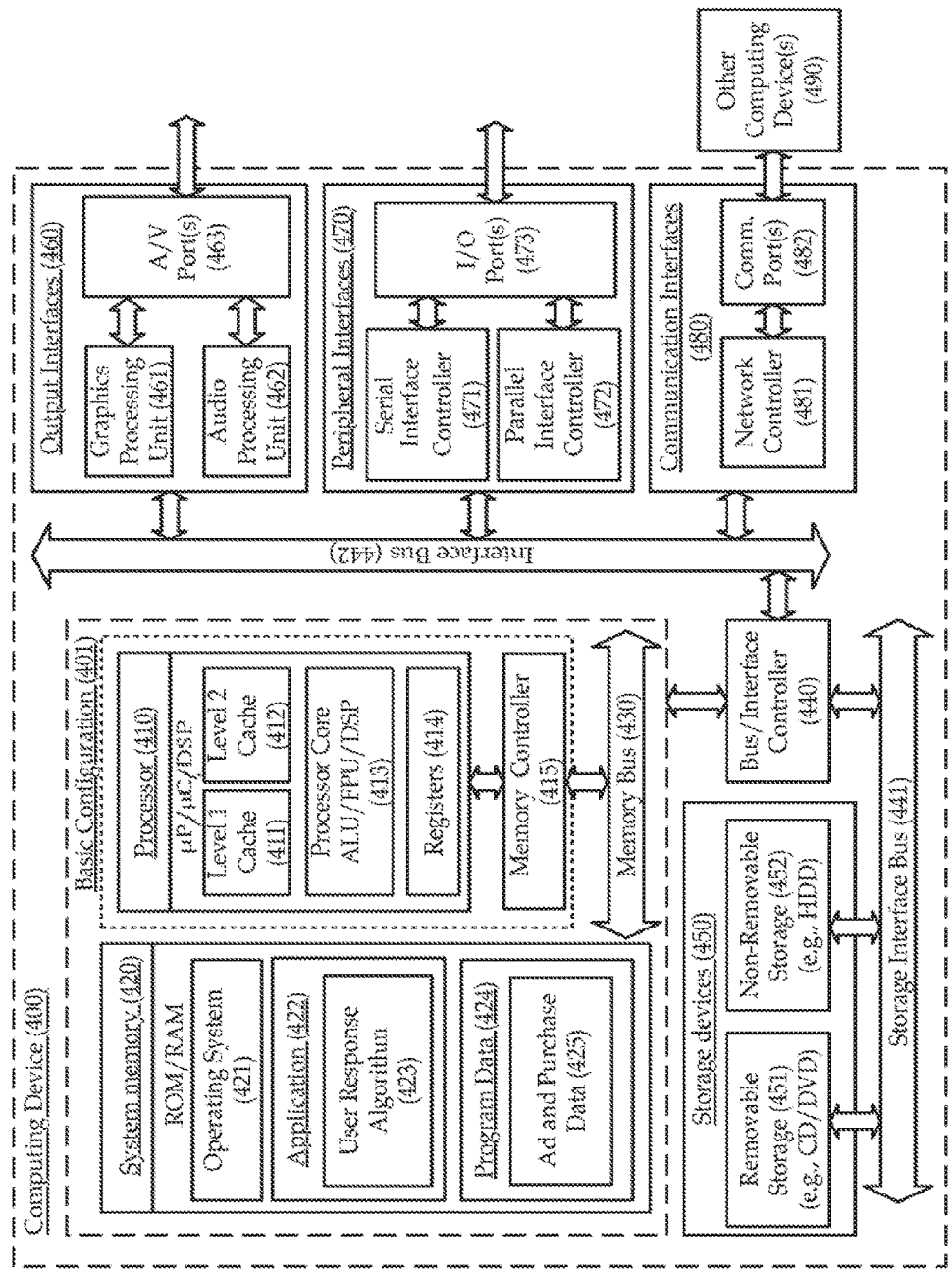
FIG. 4 is a block diagram of an illustrative embodiment of a computing device arranged in accordance with at least some embodiments of the present disclosure.

FIG. 4 is a block diagram illustrating an example computing device 400 that is arranged in accordance with at least some embodiments of the present disclosure. In one example configuration 401, computing device 400 may include one or more processors 410 and system memory 420. A memory bus 430 may be used for communicating between the processor 410 and the system memory 420.

Depending on the desired configuration, processor 410 may be of any type including but not limited to a microprocessor (μP), a microcontroller (μC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP core), or any combination thereof. A memory controller 415 may also be used with the processor 410, or in some implementations, the memory controller 415 may be an internal part of the processor 410.

Depending on the desired configuration, the system memory 420 may be of any type including but not limited to volatile memory (such as RAM), non-volatile memory (such as ROM, flash memory, etc.) or any combination thereof. System memory 420 may include an operating system 421, one or more applications 422, and program data 424. Application 422 may include a user response algorithm 423 in a communication network that is arranged to perform the functions as described herein including the functional blocks and/or actions described with respect to process 100 of FIG. 1 and/or process 200 of FIG. 2. Program Data 424 may include ad and/or purchase (and/or location) data 425 for use with user response algorithm 423, for example. In some example embodiments, application 422 may be arranged to operate with program data 424 on an operating system 421 such that implementations of determination of user response to ad results in communication networks may be provided as described herein. For example, mobile service provider 206 may comprise all or a portion of computing device 400 and be capable of performing all or a portion of application 422 such that implementations of determination of user response to ad results in communication networks may be provided as described herein. This described basic configuration is illustrated in FIG. 4 by those components within dashed line 401.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to the basic configuration 401 via the bus/interface controller 440. Example output interfaces 460 may include a graphics processing unit 461 and an audio processing unit 462, which may be configured to communicate to various external devices such as a display or speakers via one or more NV ports 463. Example peripheral interfaces 470 may include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication interface 480 includes a network controller 481, which may be arranged to facilitate communications with one or more other computing devices 490 over a network communication via one or more communication ports 482. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 400 may also be implemented as a personal computer including both laptop computer and non-laptop computer configurations. In addition, computing device 400 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A computer-implemented method to route communications in a communication network associated with a plurality of mobile devices, the method comprising:
    transmitting, via a mobile service provider device configured to facilitate communications among the plurality of mobile devices, a first request for advertisement data to an ad manager;
    collecting, via the mobile service provider device, a first data set from one or more packet headers of packets sent from the mobile service provider device to one or more of the plurality of mobile devices, wherein the packet headers are effective to identify the ad manager as an originating source of the packets, and wherein the first data set includes the advertisement data, and wherein the advertisement data is associated with advertisement delivery data that identifies a day and a time of delivery of an advertisement to the mobile device, and includes user identity data;
    collecting, via the mobile service provider device, a second data set that includes purchase data which is associated with purchased product data, a time of purchase, and user identity data associated with the purchase;
    identifying, via the mobile service provider device, an indication of change in user response to the advertisement, wherein the identifying the indication of change in user response is based, at least in part, on comparing the first data set and the second data set, and wherein the identification of the indication of change in user response is based on anonymized data by utilizing the user identity data associated with the purchase in a coded format, wherein the coded format is based at least in part on applying a one way hash function to the user identity data associated with the purchase; and
    transferring, via the mobile service provider device, the indication of change in user response to the ad manager, wherein the indication of change in user response allows the ad manager to rank ad results such that advertisements determined to be most relevant by the ad manager, based, at least in part, on the indication of change in user response, are delivered to the mobile device.

2. The method of claim 1, wherein the user identity data is based, at least in part, on one or more of a user identity or a mobile device identity.

3. The method of claim 1, wherein at least a portion of the actual purchases are non-contemporaneous with delivery of the advertisement.

4. The method of claim 1, wherein the second data set includes user location data, and wherein the user location data is associated with the advertisement delivery data and the user identity data.

5. The method of claim 4, further comprising associating, via the mobile service provider device, the user location data with business address data, wherein the identification of the indication of change in user response is based, at least in part, on the user location data associated with the business address data.

6. The method of claim 1, wherein the first data set includes user location data, and wherein the user location data is associated with the advertisement delivery data and the user identity data.

7. An apparatus, comprising:
a service provider device configured to facilitate communication among a plurality of devices, wherein the service provider device is configured to:
transmit a first request for ad result data;
collect, in response to the first request, a first data set from one or more packet headers of packets sent to one or more of the plurality of devices, wherein the packet headers include an identity of an originating source of the packets, and wherein the first data set includes the ad result data associated with ad results delivered to the plurality of devices, wherein the ad result data is associated with time and day of delivery data as well as user identity data, and wherein the user identity data is based, at least in part, on one or more of a user's identity or a device's identity;
collect a second data set via the service provider device that includes purchase data, wherein the purchase data is collected from a purchase request sent from one or more of the plurality of devices, a short message service (SMS) confirmation of a transaction, or a request for approval sent to one or more of the plurality of devices;
determine an indication of change in user response to one or more of the ad results, wherein the determination is based, at least in part, on a comparison of the first data set and the second data set,
wherein the indication of change in user response allows the ad results to be ranked such that ads determined to be most relevant, based, at least in part, on the indication of change in user response, are delivered to the plurality of devices;
create a combined database that comprises the first data set and the second data set;
anonymize the combined database based, at least in part, on the user identity data in a coded format, wherein the anonymization of the combined database protects an identity of a user associated with the user identity data and wherein the coded format is based at least in part on applying a one way hash function to the user identity data; and
allow one or more third parties to access the combined database, wherein the one or more third parties monitor success of a current advertisement campaign based on a comparison of the ad result data stored in the combined database against actual purchases made by the user.

8. The apparatus of claim 7, wherein the purchase data is associated with one or more actual purchases made via at least one of the plurality of devices, and wherein the purchase data is associated with purchased product data, time of the purchase data, and the user identity data.

9. The apparatus of claim 7, wherein at least a portion of the actual purchases are non-contemporaneous with the ad results.

10. The apparatus of claim 7, wherein the second data set includes user location data, and wherein the user location data is associated with the time and day of delivery data and the user identity data.

11. The apparatus of claim 10, wherein the service provider device is further configured to associate the user location data with business address data, and wherein the determination of the indication of change in user response to one or more of the ad results is based, at least in part, on the user location data associated with the business address data.

12. An article for use with a communication network, the article comprising:
a non-transitory signal bearing medium comprising machine-readable instructions stored thereon, which in response to execution by one or more processors, operatively enable a computing device to perform or control performance of operations to:
compare a first data set with a second data set,
wherein the first data set includes ad result data associated with ad results delivered to at least one of a plurality of mobile devices, and wherein the ad result data is associated with time and day of delivery data and user identity data, and
wherein the second data set includes purchase data associated with at least one purchase made via the at least one of the plurality of mobile devices, and wherein the purchase data includes purchased product data, time of the purchase data, and the user identity data;
detect an indication of change in user response to one or more of the ad results, wherein the detection is based on the comparison,
wherein the indication of change in user response allows ad results to be ranked such that ads determined to be most relevant, based, at least in part, on the indication of change in user response, are delivered to the at least one of the plurality of mobile devices;
create a combined database that comprises the first data set and the second data set;
anonymize the combined database based, at least in part, on the user identity data in a coded format, wherein the coded format is based at least in part on applying a one way hash function to the user identity data, and wherein the anonymization of the combined database protects an identity of a user, of the at least of the plurality of mobile devices, that is associated with the user identity data; and
allow one or more third parties to access the combined database to facilitate the one or more third parties to monitor success of a current advertisement campaign based on a comparison of the ad result data stored in the combined database against actual purchases performed by the user of the at least one of the plurality of mobile devices.

13. The method of claim 1, further comprising providing, via the mobile service provider device, information indicative of cumulative advertising effect, wherein the information is based on the second data set that includes the purchase data.

14. A computer-implemented method to route communications in a communication network associated with a plurality of devices, the method comprising:
collecting, via a service provider device that is configured to facilitate communications among the plurality of devices, a first data set from one or more packet headers of packets sent to the plurality of devices, wherein the packet headers include an identity of an originating source of the packets, and wherein the first data set includes:
advertisement data associated with advertisements delivered to the plurality of devices, and
first user location data that indicates location of the plurality of devices;

collecting, via the service provider device, a second data set that includes purchase data associated with purchased product data and includes second user location data;

determining, via the service provider device, an indication of change in user response to the advertisements, wherein the determination is based at least in part on comparing the first data set and the second data set;

creating, by the service provider device, a combined database that stores the first data set and the second data set;

anonymizing the combined database based, at least in part, on user identity data in a coded format, wherein the coded format is based at least in part on applying a one way hash function to the user identity data, and wherein the anonymization of the combined database protects an identity of a user associated with the user identity data; and allowing, by the service provider device, access to the combined database to a third party to facilitate the third party to one of monitor success of an advertisement campaign or formulate a new advertisement campaign.

15. The method of claim 14, wherein at least a portion of the purchased product data is non-contemporaneous with delivery of the advertisements.

16. The method of claim 14, wherein the first user location data is associated with the advertisement data and the user identity data.

17. The method of claim 14, further comprising providing information indicative of cumulative advertising effect, wherein the information is based on the second data set that includes the purchase data.

18. A computer-implemented method to route communications in a communication network associated with a plurality of devices, the method comprising:

collecting, via a service provider device that is configured to facilitate communications among the plurality of devices, a first data set from one or more packet headers of packets sent to the plurality of devices, wherein the packet headers include an identity of an originating source of the packets, and wherein the first data set includes first user identity data that indicates which user was logged on to a corresponding device at a delivery time of an advertisement;

collecting, via the service provider device, a second data set that includes data associated with a purchased product, wherein the second data set includes second user identity data that indicates which user was logged on to a corresponding device at a purchase time of the product, and wherein the product is associated with the advertisement;

determining, via the service provider device, an indication of change in user response to the advertisement, wherein the determination is based at least in part on a comparison of the first data set and the second data set;

creating, by the service provider device, a combined database that stores the first data set and the second data set;

anonymizing, by the service provider device, the combined database based, at least in part, on the first user identity data and the second user identity data in a coded format, wherein the coded format is based at least in part on applying a one way hash function to the first user identity data and/or the second user identity data, and wherein the anonymization of the combined database protects an identity of one or more users associated with the first user identity data and/or the second user identity data; and allowing, by the service provider device, access to the combined database to a third party to facilitate the third party to one of monitor success of an advertisement campaign or formulate a new advertisement campaign.

19. The method of claim 18, wherein at least a portion of the data associated with the purchased product is non-contemporaneous with delivery of the advertisement.

20. The method of claim 18, wherein the first data set includes data associated with the advertisement.

21. The method of claim 18, further comprising providing information indicative of cumulative advertising effect, wherein the information is based on the second data set that includes data associated with the purchased product.

22. A computer-implemented method to route communications in a communication network associated with a plurality of devices, the method comprising:

receiving, by a service provider device that is configured to facilitate communications among the plurality of devices, a notice that includes advertisement data associated with advertisements delivered to the plurality of devices, wherein the advertisement data that is included in the received notice is different from the advertisements that are delivered to the plurality of devices, and wherein the received notice provides the service provider device with the advertisement data without the service provider device accessing the advertisements delivered to the plurality of device;

receiving, by the service provider device, a data set that includes purchase data associated with purchased product data and user location data, wherein the purchase data comprises anonymized data by utilizing user identity data associated with the purchase in a coded format, wherein the coded format is based at least in part on applying a one way hash function to the user identity data associated with the purchase;

determining, by the service provider device, an indication of change in user response to the advertisements, wherein the determination is based, at least in part, on a comparison of the advertisement data and the data set; and allowing, by the service provider device, access to the database to a third party to facilitate the third party to one of monitor success of an advertisement campaign or formulate a new advertisement campaign.

23. The method of claim 22, further comprising providing information indicative of cumulative advertising effect, wherein the information is based on the data set that includes the purchased product data.

* * * * *

UNITED STATES PATENT AND TRADEMARK OFFICE
CERTIFICATE OF CORRECTION

PATENT NO. : 10,198,745 B2  
APPLICATION NO. : 14/172753  
DATED : February 5, 2019  
INVENTOR(S) : Kruglick Page 1 of 1

It is certified that error appears in the above-identified patent and that said Letters Patent is hereby corrected as shown below:

In the Claims

In Column 17, Line 43, please delete "data and" and insert -- data, and -- therefor.

In Column 18, Line 40, please delete "least of" and insert -- least one of -- therefor.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*